J. G. VINCENT.
VIBRATION DAMPING MECHANISM.
APPLICATION FILED SEPT. 10, 1915.

1,234,978.

Patented July 31, 1917.
2 SHEETS—SHEET 1.

Witness;
E. R. Barrett.

Inventor:
Jesse G. Vincent,
by Milton Tibbetts,
Atty.

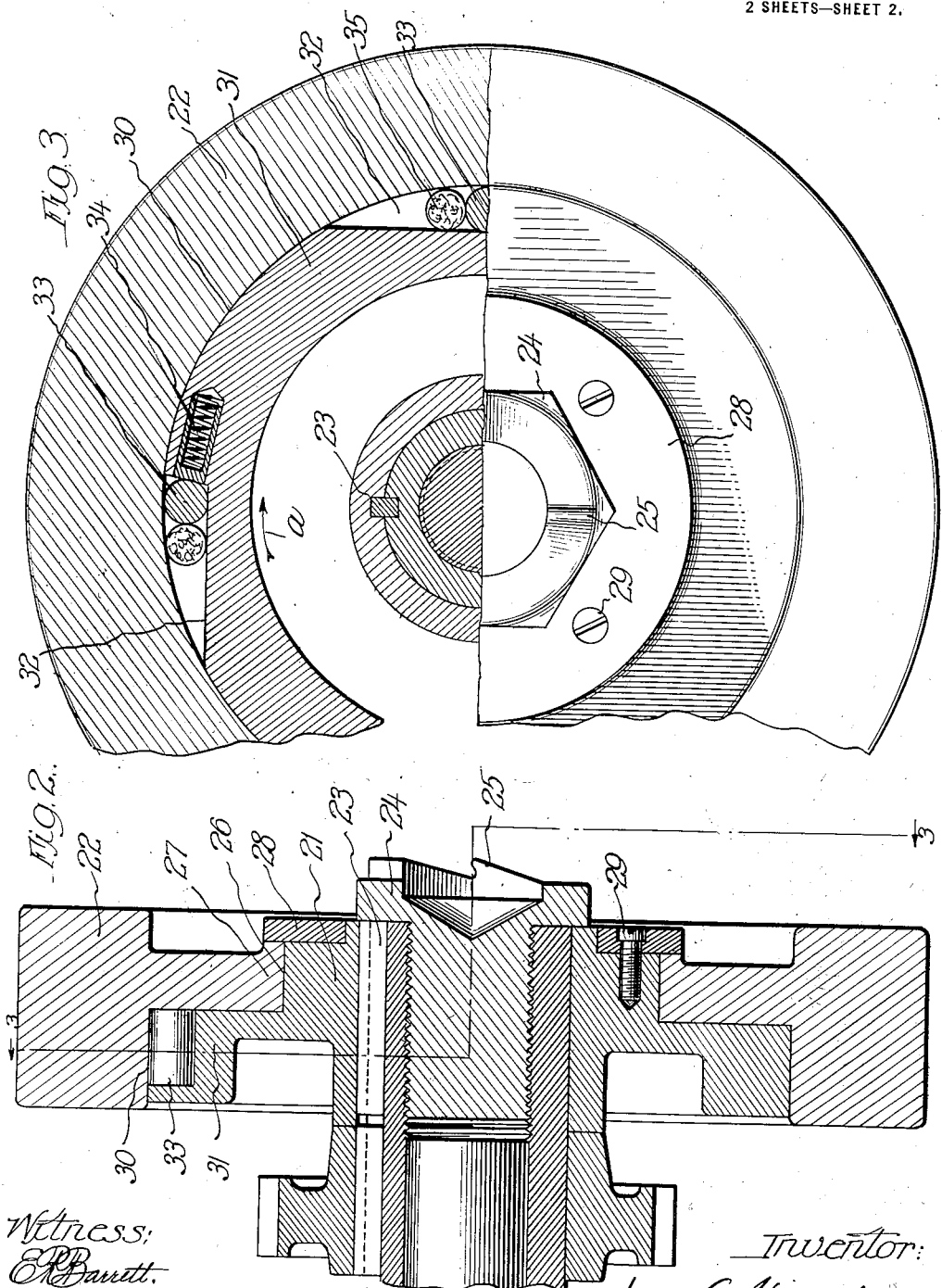

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

VIBRATION-DAMPING MECHANISM.

1,234,978.      Specification of Letters Patent.      Patented July 31, 1917.

Application filed September 10, 1915. Serial No. 49,927.

*To all whom it may concern:*

Be it known that I, JESSE G. VINCENT, a citizen of the United States, and resident of Detroit, Wayne county, State of Michigan, have invented certain new and useful Improvements in Vibration-Damping Mechanism, of which the following is a specification.

This invention relates to hydrocarbon motors and particularly to multi-cylinder hydrocarbon motors in which a long crank shaft is employed. In such motors, with a flywheel mounted at one end, there is sometimes set up in the crank shaft what may be termed "periodic torsional vibration," or torsional vibration which occurs at or around one or more particular speeds of the motor, due to one or more of the explosions in the cylinders synchronizing in point of time with the natural vibration periods of the crank shaft. This vibration is transferred to the frame or base of the motor through the reciprocating parts of the latter and becomes objectionable particularly when it occurs at high speed. The present invention has for its salient object the provision of means for damping out or reducing such vibrations, and while but one form of the invention is shown and described it will be understood that this is illustrative only and various modifications may be made without departing from the spirit or scope of the invention.

Broadly, the invention consists of the combination of a motor crank shaft having the usual rigid flywheel and another flywheel connected to the crank shaft by an overrunning clutch, and the objects of the invention will be clearly understood from the following description taken in connection with the drawings which form a part hereof, and in which:

Fig. 2 is an enlarged sectional view of the smaller flywheel and overrunning clutch; and Fig. 3 is a part section and part elevation view, approximately on the line 3—3 of Fig. 2.

Figure 1:
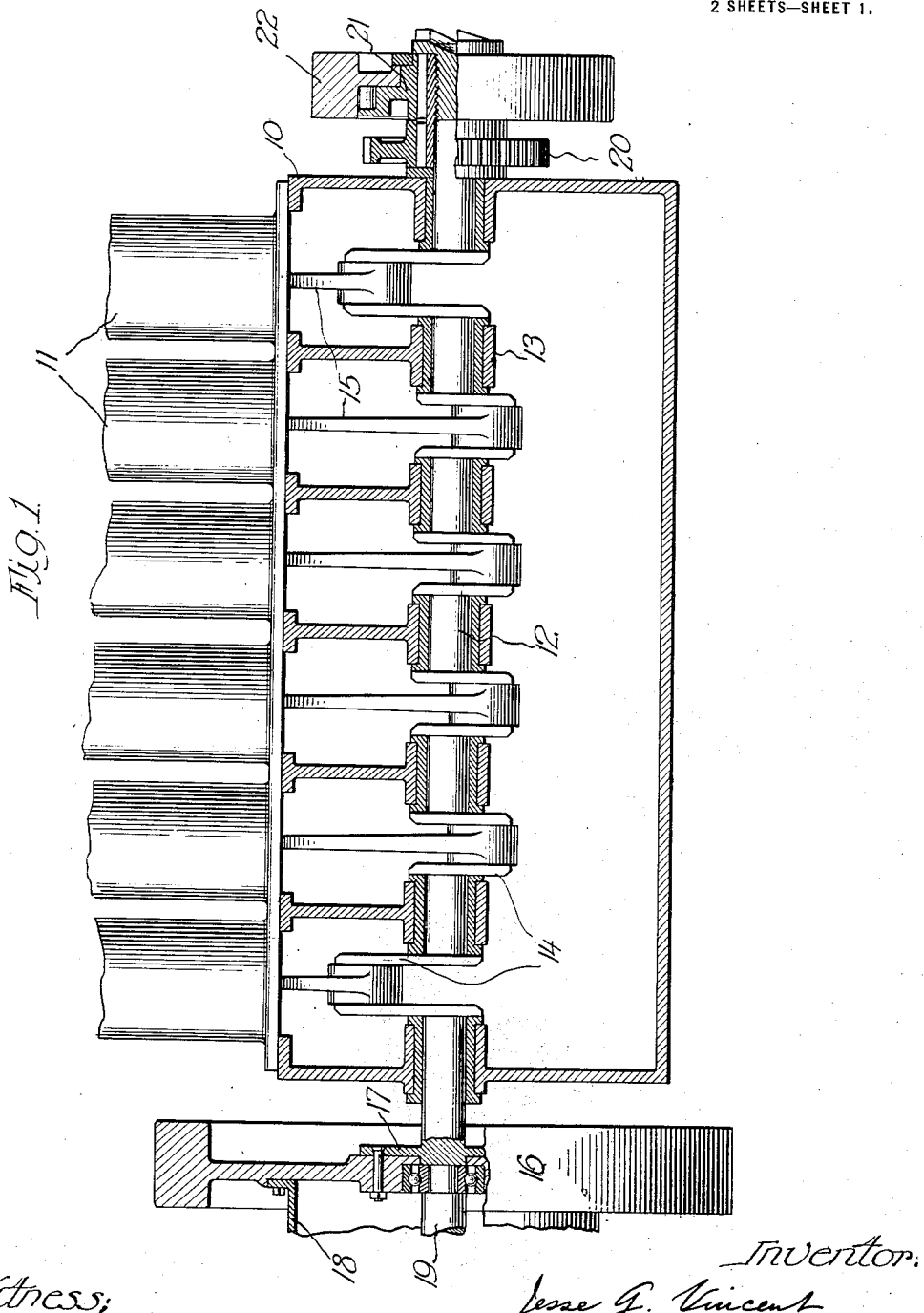
Figure 1 is a longitudinal view of a motor embodying the invention.

Referring to the drawings, 10 indicates the crank case of a motor and on this crank case a plurality of cylinders 11 are arranged. In Fig. 1 of the drawings I have shown six of the cylinders 11, but it will be understood that the invention is in no wise limited to a six-cylinder motor and may be applied to a motor having any preferred number of cylinders. A crank shaft 12 is supported in suitable bearings 13 in the crank case and is provided with cranks 14, there being a crank for each of the cylinders 11, and the connecting rods 15 are operatively connected with the cranks 14 whereby the usual pistons in the cylinders 11 are adapted to rotate the shaft 12. Any suitable number of bearings 13 may be provided.

In order to balance the variations in power applied to the crank shaft by the pistons it is customary to mount on one end of the crank shaft a flywheel such as is indicated at 16. In the particular embodiment of the invention shown the flywheel 16 is bolted to a flange 17 on the crank shaft and carries a clutch casing indicate at 18. A clutch shaft is shown at 19 and it will be understood that any suitable form of clutch will be provided for operatively connecting the casing 17 with the shaft 19 in order to transmit the power of the motor to the shaft. The mechanism thus far described is commonly used and my improvements consists in mechanism applied to the opposite end of the crank shaft, from the flywheel 16, for the purpose of damping the vibrations above referred to.

Mounted upon the end of the crank shaft remote from the flywheel 16 is a gear 20 for driving the usual cam shaft and other auxiliary mechanism of the motor. Also mounted at this end of the crank shaft is the vibration damper which consists principally of an inner or flange member 21 and an outer or inertia member 22. The member 21 is shown as keyed to the crank shaft as by the key 23, and this member and the gear 20 are retained on the shaft by a nut 24, said nut in the present instance also being provided with clutch teeth 25 for the usual starting crank.

Said inner member 21 is formed with a cylindrical surface 26, upon which the hub 27 of the outer member or flywheel 22 is rotatably mounted. A washer 28 retains the flywheel in position and is itself removably secured to the inner member 21 as by the screws 29.

The flywheel member 22 is formed with an internal cylindrical surface 30 which surrounds the flange 31 of the inner member and said flange is formed with several tangential grooves 32, in which rollers 33 are adapted to operate. The wall of each of these grooves 32 is so formed that the roller therein will fit loosely in the deepest part of the groove, but will be wedged in between said wall and the interior cylindrical wall 30 of the flywheel 22 when the latter is rotating in one direction. A spring device 34 presses against each of the rollers 33 to force the latter yieldingly in contact with the cylindrical surface 30. There is also a lubricating roller 35 for each of the rollers 33, which roller 35 is formed of suitable absorbent material, and soaked with oil.

From the above description, it will be evident that if the crank shaft 12 and consequently the inner member 21 is rotating in the direction of the arrow $a$ in Fig. 3, the rollers 33 will be jammed or wedged in between the surfaces 32 and 30, and the flywheel 22 will be carried around with the member 21. Should the member then be suddenly stopped or slowed down, the inertia of the flywheel 22 would tend to continue to rotate it, and as there would then be no wedging action of the roller 33, the flywheel 22 would run ahead of the inner member 21 and be brought to rest slowly by friction. Thus, also, if the crank shaft 12, during its rotation, should vibrate torsionally, there would be a quick repetition of this clutching and unclutching of the roller 33 and because of the asynchronous action of the flywheel 22 with relation to the inner member 21, the torsional vibrations of the latter would be damped out.

Having thus described my invention, what I claim and desire to secure by Letters Patent is:—

1. In a multi-cylinder hydrocarbon motor, in combination, a crank shaft having a plurality of cranks, a flywheel rigidly secured adjacent one end of said shaft, and another flywheel connected to the other end of said shaft by an overrunning clutch.

2. In a multi-cylinder hydrocarbon motor, in combination, a crank shaft having a plurality of cranks, a flywheel rigidly secured adjacent one end of said shaft, and another flywheel connected to said shaft remote from the first flywheel by an overrunning clutch.

3. In a multi-cylinder hydrocarbon motor, in combination, a crank shaft having a plurality of cranks, a flywheel rigidly secured adjacent one end of said shaft, and a smaller flywheel connected to said shaft adjacent its other end by an overrunning clutch.

4. In a multi-cylinder hydrocarbon motor, in combination, a crank shaft having a plurality of cranks, a flywheel rigidly secured adjacent one end of said shaft, a smaller flywheel, and an overrunning clutch connection between said shaft and said smaller flywheel.

5. The combination with the crank shaft of a hydrocarbon motor, of an inertia member surrounding a part of said shaft, and an overrunning clutch connection between said shaft and said inertia member.

6. The combination with the crank shaft of a hydrocarbon motor, of an inertia member mounted co-axial with said shaft and surrounding a part of said shaft, and an overrunning clutch connection between said shaft and said inertia member.

7. The combination with the crank shaft of a hydrocarbon motor, of a flywheel mounted to rotate relative thereto and surrounding a part of said shaft, and a roller clutch connection between said shaft and said wheel whereby the wheel is adapted to run by momentum faster than the shaft.

In testimony whereof I affix my signature.

JESSE G. VINCENT.